United States Patent [19]

Hansen

[11] 4,092,997

[45] June 6, 1978

[54] CONSTRAINT MEANS FOR FLEXIBLE ELEMENTS

[75] Inventor: Howard C. Hansen, Battle Creek, Mich.

[73] Assignee: Clark Equipment Company, Buchanan, Mich.

[21] Appl. No.: 762,540

[22] Filed: Jan. 26, 1977

[51] Int. Cl.² ............................................. F16L 33/00
[52] U.S. Cl. ............................... 137/351; 137/355.17; 138/111; 174/69; 187/9 E
[58] Field of Search .................... 137/343, 355.17, 799, 137/351; 138/111; 174/69, DIG. 9; 187/9 E; 191/12 R, 12 C; 214/DIG. 11; 254/2 R

[56] References Cited

U.S. PATENT DOCUMENTS

| | | | |
|---|---|---|---|
| 2,621,075 | 12/1952 | Sedar | 138/111 UX |
| 2,897,254 | 7/1959 | Dickinson | 174/69 X |
| 2,959,634 | 11/1960 | Lyon | 174/69 X |
| 3,042,742 | 7/1962 | Foster | 174/69 |
| 3,075,732 | 1/1963 | Lindenmeyer | 137/343 X |
| 3,541,334 | 11/1970 | Sobolewski | 174/69 X |
| 3,551,612 | 12/1970 | Guentner | 174/69 X |
| 3,623,501 | 11/1971 | Reimbold | 137/355.17 |
| 3,752,180 | 8/1973 | Elder | 137/355.17 |

FOREIGN PATENT DOCUMENTS

| | | | |
|---|---|---|---|
| 773,584 | 11/1934 | France | 138/111 |
| 1,127,100 | 12/1956 | France | 174/117 |
| 69,572 | 11/1958 | France | 174/69 |
| 457,576 | 8/1968 | Switzerland | 174/69 |
| 732,501 | 6/1955 | United Kingdom | 174/69 |

*Primary Examiner*—Alan Cohan
*Assistant Examiner*—Gerald A. Michalsky
*Attorney, Agent, or Firm*—John C. Wiessler

[57] ABSTRACT

At least three elongated flexible elements bonded together lengthwise to form constraint means arcuate in cross-section for forcing said elements to move in a predetermined path in which the flexible elements are bent longitudinally to form a loop of substantially uniform radius intermediate the ends thereof so that at least a portion of the loop is forced into a flat cross-section while the straight portions or trailing lengths of said elements on opposite sides of the loop are self-constrained in relatively stiff and straight runs whether either straight portion is pulled or pushed in relation to the loop, such that the flexible elements move as if reeved on a reel, sheave or the like.

11 Claims, 13 Drawing Figures

CONSTRAINT MEANS FOR FLEXIBLE ELEMENTS

BACKGROUND OF THE INVENTION

Many types of vehicles and machines require flexible hose and/or electric line systems for conducting pressurized fluids and/or electric current to moving components. For example, in industrial lift trucks it is often necessary to provide several flexible hydraulic hoses and electric cables so as to provide both hydraulic and electrical power to the elevatable carriage on the upright for the purpose of operating and controlling one of various material handling devices or attachments which may be mounted on the carriage.

In an exemplary lift truck application hydraulic hoses are reeved between and within the extensible sections of the upright, generally paralleling the lift chains. Reels or sheaves are normally mounted on the upright to guide the hoses and cables, and springs are used to hold them taut. Such systems are usually limited to a pair of hoses, sufficient for simple attachments mounted on the carriage, but inadequate for more complex attachments.

In other lift truck arrangements hydraulic hose reels are mounted on the outside of the upright, which may be in addition to the above internal system when more than two hoses are required. Such hose reels are relatively large, bulky and expensive, and being mounted externally are subject to damage. Being mechanical they are, of course, subject to wear, and required hose reel swivel seals are a source of hydraulic leaks. Hoses sometimes stack up in the reel and bind or run off the reel. Inherent in such systems is an undesirable pressure drop between the pump and the attachment because of the required number of hydraulic fittings which are used.

In some prior applications it has been possible to eliminate such reels and sheaves by utilizing troughs connected to relatively fixed and moving elements of any machinery in which the moving element moves in oscillatory straight-line motion and flexible hose or electric cable is connected to the far ends of the fixed and movable elements so that the hose or cable rolls from one trough to the other without the need of a guide reel.

Electric cable reels are used to provide electrical communication with various devices in many applications in which a moving device is connected by extensible cable, such as in the lift truck application discussed above. Such reels and cable are subject to physical damage, in addition to cable pile-up, jamming and run-off. Such reels are relatively expensive, large and bulky when more than a few electric lines are involved.

Certain prior patents illustrate two or more hoses bonded together in a hose manifold or assembly for conducting one or more fluids, and the like, from one location to another. Exemplary are U.S. Pat. Nos. 2,916,055 and 3,907,022. The basic lack in all known prior art is the absence of the concept of an arcuate configuration in cross-section from which flow the advantages of this invention.

The principle which governs the kinematics of my invention can be demonstrated by a steel measuring tape of the type which has a concave side and a convex side; i.e., the cross-section of the tape has an arcuate shape. The tape when bent back upon itself exhibits the properties of interest here, viz., that of remaining relatively stiff and straight along the trailing lengths of the tape on opposite sides of the loop, the bend of the loop inherently being of uniform radius. The tape then has the characteristic of being able to roll in either direction while the loop of uniform radius is maintained as one straight section is pushed toward or pulled away from the loop.

SUMMARY

My invention is cable of a number of different embodiments or forms. Basically implemented is the discovery that by constraining three or more elongated flexible elements in arcuate cross-section, as by bonding or connecting together lengthwise such relatively rigid flexible elements, and then bending the same lengthwise to form a loop intermediate the ends thereof, that internal forces are generated which flatten the arcuate cross-section of at least a portion of the loop, whereupon a trailing length or straight portion of the constrained flexible elements may be actuated axially thereof in either direction which causes the loop to move as if reeved on a longitudinally movable reel, sheave or the like.

It is a principal object of the invention to provide an improved system of flexible elements for conducting pressurized fluids, electric current, light, and the like, the latter being conducible by flexible conduit means in the field of fiber optics, for example.

A further object is to provide improvements in such systems in respect of simplicity, cost, efficiency, reliability, and utility.

DETAILED DESCRIPTION

Figure 1:
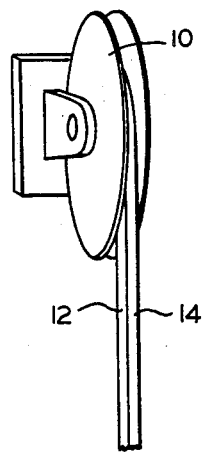
FIG. 1 is a perspective view of a conventional bonded two hose system on a reel.

FIG. 1 depicts a hose reel 10 having conventional hoses 12 and 14 bonded together along their length. Since hydraulic hoses tend to change length when pressurized, bonding them together causes the two hoses to tend to stretch and contract together when one or the other is pressurized. Also, two or more hoses bonded together in a plane function like a flat ribbon or belt in winding onto a reel, and wind more neatly than individual unbonded hoses.

Figure 2:
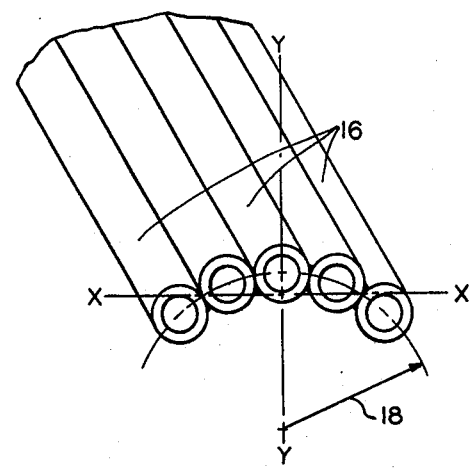
FIG. 2 is a perspective view of a portion of a five hose system bonded lengthwise to form an arcuate cross section in accordance with my invention.

FIG. 2 illustrates a general embodiment of my invention in which five hoses 16 are bonded together along their length so as to form a configuration of arcuate cross-section having a radius 18. The hoses are, in such an arrangement, mutually supportive, the combination having a substantial section modulus about axis Y—Y, and as a result of bonding in arcuate section, having a lesser but yet substantial section modulus about axis X—X.

Figure 3:
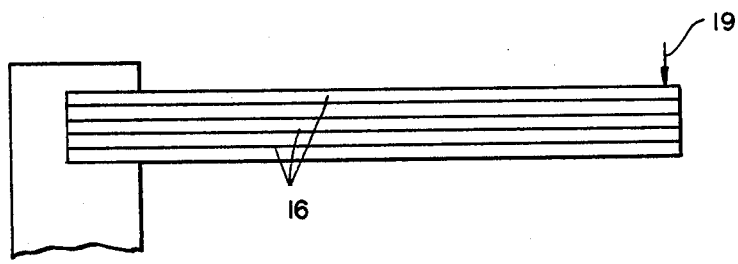
FIGS. 3, 4 and 5 illustrate a cantilevered section of the hose system of FIG. 2 under a lateral end force in different configurations to illustrate in functional result the resistance of the section modulus about the X and Y axes of FIG. 2.

FIG. 3 represents a plan view of a portion of the hose assembly of FIG. 2 cantilevered as shown and having a force 19 applied, as represented by the arrow, from one side at the outer end of the hose assembly, in which relationship the section modulus about the Y—Y axis is sufficient to prevent the hose assembly from sagging appreciably.

Figure 4:
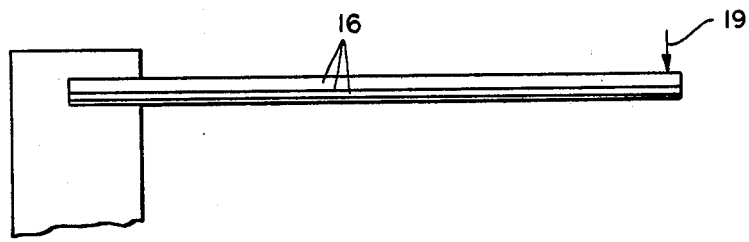
Figure 5:
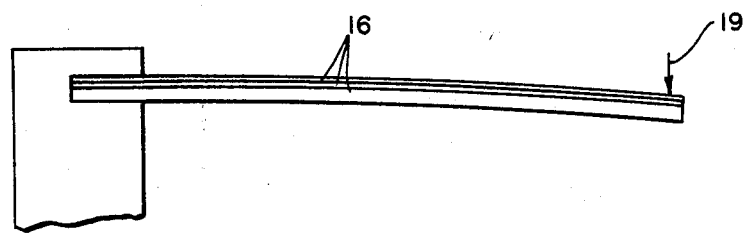

In FIG. 4 a side view of the hose assembly is illustrated in which the concavity of the hose assembly curves upward, whereas in FIG. 5 a similar cantilevered hose assembly has the concavity curving downward. In FIG. 4 the section modulus about the X—X axis provides a substantial resistance to downward bending, whereas in FIG. 5 the section modulus is substantially less, as illustrated by the sagging condition of the hose assembly.

Of course, the construction of the hose itself has a considerable bearing upon the resistance to bending about the X and Y axes for any given hose diameter and radius 18. I have found that hose well suited to the purpose is "Synflex" hose manufactured by Samuel Moore and Company of Mantua, Ohio. It is a non-metallic type of pressure hose having a nylon or polyurethane core tube, a double polyester braid, and a polyurethane cover. This type of hose has a tough and rather substantial outer cover, which is also of significance for the purpose here intended. Inasmuch as all hoses in the use of my invention would ordinarily be of the same type with outer covers of the same material, they can be very strongly bonded together in a selected configuration providing any desired design radius 18.

In the embodiment of FIG. 2, the number of hoses in a given such assembly is not of importance insofar as the desirable characteristics discussed above are concerned, provided that the number of bonded hoses comprise at least three. With any less than three, of course, the hoses could not be bonded to form an arcuate cross section which would exhibit the desirable characteristics of the invention.

Thus far it will be seen that three or more hoses having a substantial section modulus when bonded together as aforesaid exhibit a characteristic of stiffness or a tendency to remain in a straight line and to resist bending in all directions to a greater degree than a like number of identical hoses acting singly. The tendency of the arcuate hose assembly to remain straight notwithstanding, the assembly can readily be bent to form a loop which exhibits a useful characteristic in that the bend or loop is of substantially uniform radius while the trailing lengths of the hose on opposite sides of the bend remain straight. Moreover, the radius to which the hose combination bends can be controlled somewhat by the selection of hose, as in the characteristics of hose diameter, wall thickness and materials, as well as by the design of the location, mass and width of the bond between adjacent hoses. However, it has been found that the radius of the arcuate cross-section is of particular importance in determining the radius of bend of the hose assembly. I have found that in any given such hose assembly the radius of the bend is primarily a function of the radius of the arc.

Figure 6:
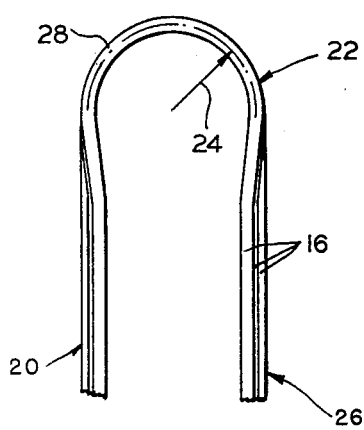
FIG. 6 shows a section of the hose system of FIG. 2 bent through an angle of 180°.

FIG. 6 shows a hose assembly as in FIG. 2 bent to form the loop illustrated wherein there is a straight portion or trailing length 20, a section 22 bent in an arc of about 180° having a radius 24 which is a function of radius 18, and a straight portion 26. The radius 24 remains substantially constant irrespective of the angle of bend, within limits; i.e., if the angle of bend is decreased or increased from 180° the radius 24 remains the same and only the length of the arc of the bend changes. All of the hoses in the loop or bend have a common neutral stress axis, irrespective of the number of hoses assembled in accordance with my invention. In FIG. 6 the common neutral axis is represented by the broken line at numberal 28.

If the end of straight portion 20 is moved upwardly along its length and the end of straight portion 26 is held fixed or is moved downwardly along its length, the hose assembly will make a transition which rolls through loop 22 from portion 20 into portion 26, basically the same as if it were being carried around by a sheave.

Although FIG. 2 portrays the cross-sectional profile of the hoses as having a uniform radius 18, the arcuate curve need not be of uniform curvature, but may be a portion of an ellipse, parabola, or any suitable curve of changing curvature and inflection. For example, although probably impractical for commercial implementation, the multiple elastic hoses such as described above could be arranged so as to have a sinusoidal wave form in cross-section, or any other curving configuration, if the phenomenon of generation of internal forces is produced at the loop or bend which substantially flattens the curved cross-section of the hose in the loop or bend. The flattening effect produces the desired phenomenon in operation. In any such alternate construction which departs from an arc of substantially uniform radius, such as radius 18, the resulting radius of curvature of the loop will be some mean or average of the curvature of the arc or arcs which may bear a complex or even indeterminate mathematical functional relationship, but which may be empirically determined, if necessary, by variations in the configuration of the arc. As a practical matter, it would be normally expected that an arc of substantially uniform radius, such as at numeral 18, would be most readily applicable in the production of such hose assemblies and would be most readily determinable in respect of the functional relationship thereof to the radius of the loop or bend.

Considering the variable combinations of characteristics of hose which may be used to implement the invention, there will be instances in which greater internal forces are required to force the arc of the assembly into a substantially flat profile within the arc of the loop than can be produced by a given hose construction and assembly, in which event it will be found necessary, for example, to modify the design of the bond between the individual hoses, as will be discussed below in the description of FIGS. 9-11.

A flattening of the arcuate section through the bend of the hose assembly tends to produce a cross-section in the bend of a plane having an infinite radius or, depending upon the mechanical properties of the conduits and bonding thereof, a substantially flattening of the arcuate straight sections of the assembly, but of a finite radius. The term "flattening", or equivalent, as used in the specification and claims hereof is intended to cover all such variations in radius of cross-section in the bend of a hose assembly which is capable of effecting the phenomena which eliminates the prior requirements of sheaves, reels and the like.

Figure 7:
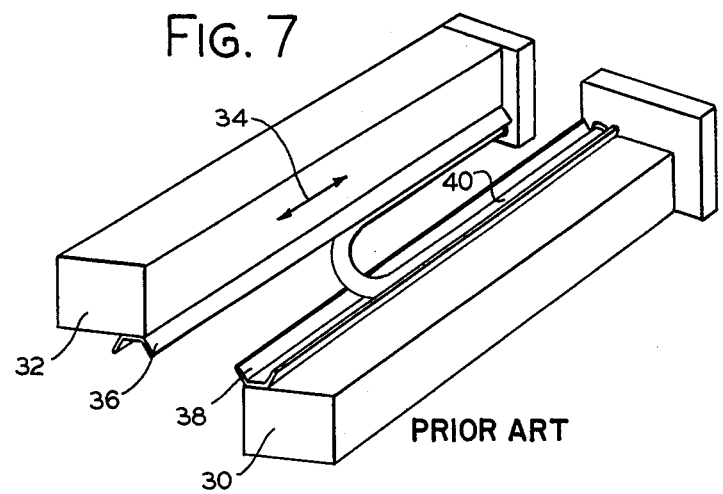
FIG. 7 illustrates a conventional arrangement for conducting fluids or electrical power from a fixed to a moving element by way of a hose or cable constrained in troughs.

In FIG. 7 is illustrated an exemplary conventional arrangement for conducting fluids or electrical power from a fixed element 30 to an element of machinery 32 moving in an oscillatory straight-line motion in the direction indicated by arrow 34. A guide trough 36 is fixed to element 32 and a similar trough 38 is fixed to element 30, the troughs being in parallel relationship. A hose or electrical cable 40 is fixed and conductively connected to the remote end of element 30, nests within trough 38, bends through 180° for nesting within trough 36 and is fixed and conductively connected at the remote end of element 32. As is apparent, element 32 may oscillate within the predetermined limits in straight-line motion as indicated by arrow 34, and the hose or cable will simply roll from trough to trough without need of a guide pulley.

Figure 8:
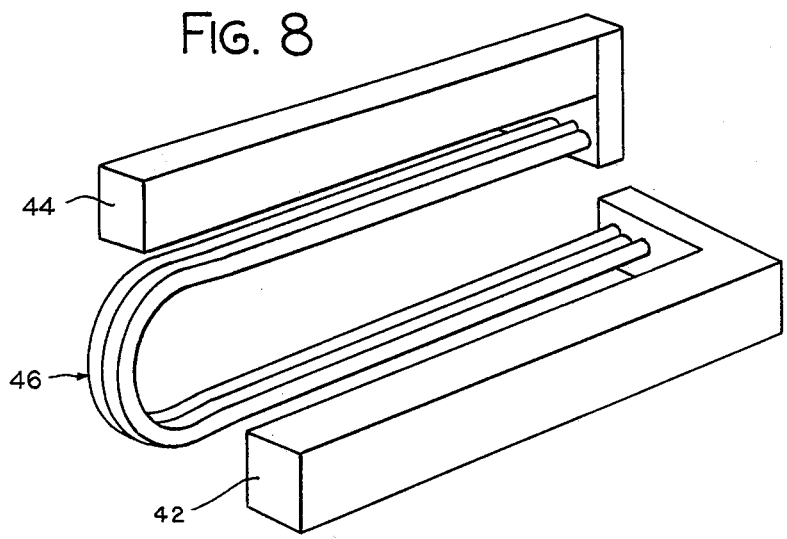
FIG. 8 is similar to FIG. 7 but illustrates the use of my invention in a three bonded hose or cable system.

FIG. 8 illustrates a similar system comprising a stationary element 42, an oscillating element 44, and an arcuate hose assembly in accordance with my invention illustrated at 46 and connected to the respective elements 42 and 44 as is element 40 in FIG. 7. In this arrangement the arcuate hose assembly is capable of supporting its own weight plus the weight of the contained fluids or electric lines, and no supportive troughs are required. In FIG. 7 the length of hose that can be accommodated is limited by the length of the troughs available for support, whereas in FIG. 8 no supportive troughs are required so that the length of stroke is limited only by the practical length of arcuate hose that can be installed.

Figure 9:
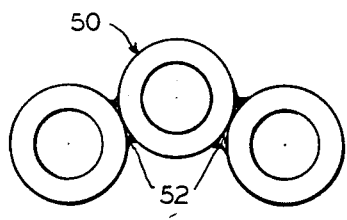
FIGS. 9, 10 and 11 show in cross-section three different embodiments of a bonded three hose system in accordance with the invention.
Figure 10:
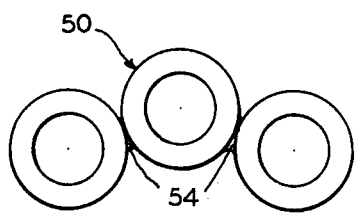
Figure 11:
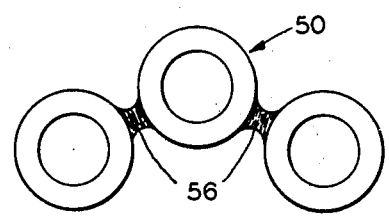

FIGS. 9, 10 and 11 illustrate three exemplary bonding designs between three hoses in each figure which are bonded in a desired arcuate relationship. In FIG. 9 the bonds between the hoses 50 are illustrated as being symmetrical bonds 52 in contact with both hoses of each related pair of hoses on both sides of the lines of contact thereof throughout the length of the hose assembly. That is, each hose is tangent to its neighboring hose (or hoses in the case of a multiple hose assembly such as in FIG. 2) and each bond extends a small but equal distance to either side of the line of tangency. In this type of bond, a relatively great amount of force is required to distort the hoses in a manner to flatten the arcuate profile in cross-section in the loop or bend of the assembly, as will be apparent.

FIG. 10 illustrates an asymmetric bond 54 in which each hose is touching or tangent to the adjacent hose, but the bond extends from the lines of tangency only towards the concave side of the profile. As will be apparent, such a bonding design requires substantially less force than in FIG. 9 to distort the assembly to flatten the arcuate profile, because the elastic bond and outer jackets of the hoses require less stretching to produce a flat profile.

In FIG. 11 an arcuate arrangement is shown in which the hoses are not in tangency, but in which additional bonding material has been added to connect the hoses as at 56. This design enables the arcuate cross-section to bend into a flat profile with substantially less force than in either FIGS. 9 or 10 because the bonding material can itself bend as well as stretch.

Of course, the stiffness characteristic of the individual hoses will largely determine which of the above exemplary methods of bonding will provide the desired stiffness characteristic to flatten the cross-section of the loop, and the radius at which the hose assembly will bend.

Figure 12:
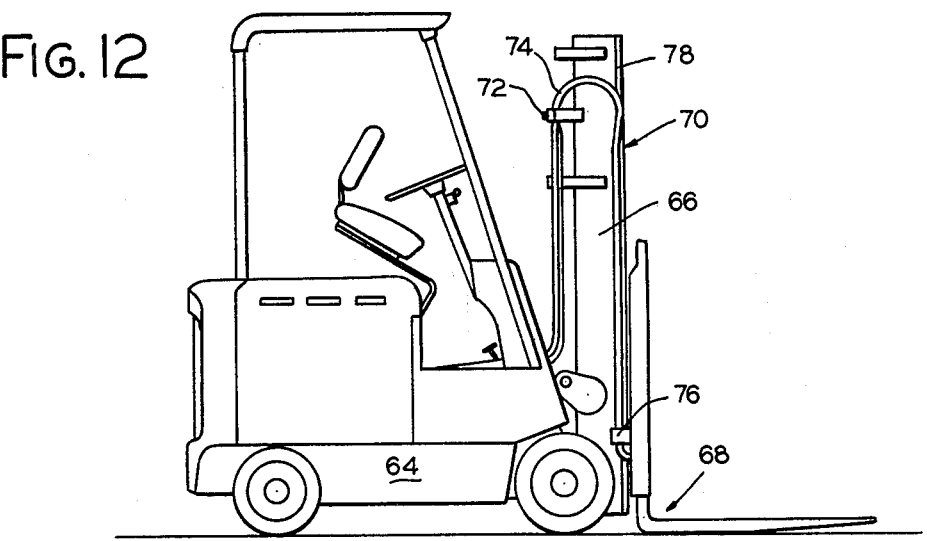
FIGS. 12 and 13 are side elevational views of an industrial lift truck which embodies my invention in which the upright is shown in two different positions of elevation.

Those skilled in the art of machinery will readily appreciate the numerous applications for which this invention may be used. An exemplary embodiment is illustrated in FIGS. 12 and 13 wherein an industrial lift truck 64 is shown having a telescopic mast assembly 66 and a fork carriage 68 mounted for elevation therein, shown in a lowered position in FIG. 12 and in a position of maximum elevation in FIG. 13.

An arcuate hose assembly 70 having any suitable number of hoses as required for conveying pressure fluid and electrical conductors (it will be understood that any required number of electrical conductors can be reeved inside one of the hoses) is connected from the hydraulic and electrical systems in the truck vertically up the back of the upright, fastened suitably by brackets to an outer cross tie member at 72, bent forwardly at 74 through an angle of approximately 180°, and thence dropped downwardly to communicate through a fixed coupling 76 with any attachment or device, not shown, which may be associated with or mounted in place of fork carriage 68.

Figure 13:
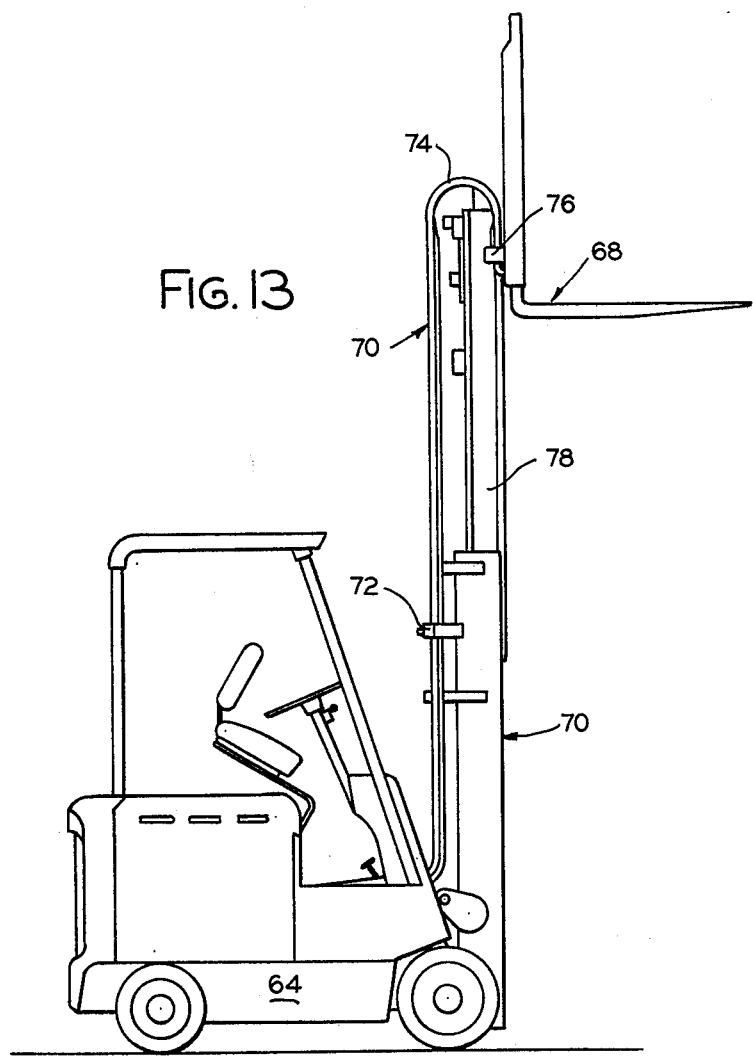

In the elevated position of FIG. 13 the operation of my invention is illustrated in which a hydraulic lift motor, not shown, has elevated a nested I-beam upright section 78 and fork carriage 68 to the positions shown during which hose assembly 70 is pushed upwardly from the front side as the fork carriage is elevated. The phenomenon of the invention occurs as the loop or bend 74 rolls upwardly in flat cross-section from FIG. 12 to FIG. 13 as the front straight portion of the hose "pays out" or rolls into the rear straight portion thereof, the reverse relationship of hose "payout" occurring during lowering of the upright.

The hose assembly may be twisted about its lengthwise axis with relative ease while retaining its straight-line stiffness characteristic. In reeving the arcuate hose assembly on some uprights, it may be desirable to twist one or more portions of it lengthwise through an angle of 90°, more or less, to improve visibility for the operator, or to enable the hose assembly to be installed in less space and closer to the upright, for example. Such may be done without interfering with the operation of the invention.

From the foregoing, it is believed that those familiar with the art will readily recognize and appreciate the novel concepts and features of the present invention. Obviously, although the invention has been described in relation to a number of embodiments, numerous other variations, changes and substitutions of equivalents will present themselves to persons skilled in the art, and may be made without necessarily departing from the scope and principles of the invention. As a result, it is not my intenton to be limited to any particular form of the invention herein illustrated and described except as may appear in the claims appended.

I claim:

1. An assembly of at least three flexible elongated hydraulic conduits flexibly bonded together lengthwise thereof in such a manner that in a cross-section of said conduits an arc having a determinate curvature may be connected between the axes of said conduits, said conduits in themselves having such mechanical properties that bending the conduit assembly lengthwise and intermediate the ends thereof effects in the bend of the assembly a substantial flattening of said arc, the radius of said bend being substantially uniform and being a function of the radius of said arc, said conduits being mutually supportive and having a substantial section modulus about a transverse axis as a function of the configuration of said arc.

2. An assembly as claimed in claim 1 wherein said arc flattens in at least a portion of said bend such that the radius thereof is substantially infinite.

3. An assembly as claimed in claim 1 wherein each adjacent pair of conduits are substantially tangent lengthwise thereof and said lengthwise bond therebetween extends in cross-section to both sides of the line of substantial tangency.

4. An assembly as claimed in claim 1 wherein each adjacent pair of conduits are substantially tangent lengthwise thereof and said lengthwise bond therebetween extends in cross-section from the area of substantial tangency towards the concave side of said arc.

5. An assembly as claimed in claim 1 wherein each adjacent pair of conduits are out of tangency lengthwise thereof and said lengthwise bond therebetween extends in cross-section as a rib connecting each adjacent pair of conduits.

6. An assembly as claimed in claim 1 wherein the arcuate conduit assembly tends to remain straight but that when bent lengthwise thereof forms a bend of said substantially uniform radius, the radius being partially a function of mechanical properties of the flexible conduits and of the depth and width of the bond between adjacent flexible conduits.

7. An assembly as claimed in claim 1 wherein an internal generation of forces within the conduit assembly forces the conduit assembly in the bend thereof into such a flattening of said arc that movement toward or away from said bend by either straight section of said conduit assembly causes a transition of said conduit assembly from one side to the other of said bend as said bend maintains said substantially uniform radius.

8. An assembly as claimed in claim 7 wherein said conduit assembly functions during such transition as if reeved on a sheave or the like at said bend.

9. An assembly as claimed in claim 8 wherein said conduit assembly is mounted on a telescopic upright assembly of an industrial lift truck for conveying hydraulic pressure fluid from the truck to a lift carriage on said upright at all elevations.

10. An assembly as claimed in claim 8 wherein one straight section of the conduit assembly is mounted on a fixed member and the other straight section thereof is mounted on a member which is movable in reciprocatory motion, said transition in said conduit assembly occurring during such motion in either direction of said movable member.

11. An assembly as claimed in claim 1 wherein said flattening of said arc in the bend of the assembly is effected by a generation of internal forces in the assembly and occurs substantially throughout the length of said bend.

* * * * *